Feb. 27, 1968     F. G. MARTIN     3,370,849
STACKING APPARATUS
Filed Sept. 12, 1966     3 Sheets-Sheet 1

Feb. 27, 1968   F. G. MARTIN   3,370,849
STACKING APPARATUS
Filed Sept. 12, 1966   3 Sheets-Sheet 3

United States Patent Office 3,370,849
Patented Feb. 27, 1968

3,370,849
STACKING APPARATUS
Francis G. Martin, Agawam, Mass., assignor to The William Carter Company, Needham Heights, Mass., a corporation of Massachusetts
Filed Sept. 12, 1966, Ser. No. 578,751
7 Claims. (Cl. 271—68)

This invention relates to apparatus for accumulating articles formed of transversely flexible material, particularly cloth, in vertical stacks, for example, after they have separately undergone some manufacturing operation, for example, stitching.

In the mass fabrication of apparel such as underwear or children's outerwear, it is common to perform some piecework operation on identically shaped fabric portions and thereafter to transport the portions, for example sleeves, to the vicinity of another machine or worker to perform the next step in fabrication of the finished goods. Sometimes the earlier operation is an automatic or semi-automatic operation discharging the goods in succession at a much greater rate than the rate of completion of the next operation. The goods hence have to be accumulated and the most convenient form of accumulation is in vertical stacks susceptible to ready manual or machine conveyance.

Present day apparatus for stacking flexible semi-limp articles being discharged in succession from one station onto a conveyor, commonly discharge the articles off the advance end of the conveyor onto a table which moves in substantial synchronism away from the end of the conveyor as each article is being discharged from the conveyor so that the article is laid out flat on the table. The table then has to return to its initial position before the next article can be discharged in order to make a vertical stack.

When spacing between the articles advancing in rapid succession along the conveyor is small, the return motion of the table then has to be so rapid that the resulting inertia becomes excessive complicating the apparatus practically to the point of inoperability and at least to the point of non-reliability due to excessive jolting of the stack. If the return motion of the table is kept at a reasonable rate, adequate space must be left between the articles for return of the table, requiring duplication by installation of another stacking machine to handle any incoming overload.

It is therefore an object of the invention to provide a vertical stacking apparatus for transversely flexible flat material utilizing a reciprocating table as before, but wherein the table return rate is wholly independent of the spacing between the articles. As a consequence the table return rate can be determined solely by the rate of the conveyor feed input as is the rate of table advance, and normally corresponds to such conveyor feed input rate.

It is a further object of the invention to increase the capacity per unit of time of reciprocating table apparatus by stacking not only on the advance stroke of the table, but also on the return stroke with the resulting advantage that the return stroke ceases to be waste motion and no longer represents lost stacking time. On the contrary, the table may be motionless for times corresponding to the time required for the input conveyor to travel the distance between succeeding articles in the succession with the result that the stroke of the table in both directions may be controlled by the length of each article being fed, the reversal of direction occurring during the interval of no-feed corresponding to the spacing between the articles. The operation can thus be and is made self-adjusting to the varying length of articles being fed within a maximum length corresponding to the maximum stroke of the table.

To accomplish the above objectives, the articles are stacked with alternate articles face up and with intervening articles face down, but this configuration is no drawback and perfectly permissible in most operations. In fact, where articles are subsequently to be processed by pairs, such stacking can be advantageous.

In the accompanying drawings, a stacking apparatus in accordance with the invention is shown operating on a succession of sleeve portions of a child's garment which have previously undergone a hemming operation along one margin. Such hemming operation has been performed for instance on a sewing machine with each successive article going through the sewing machine one at a time and being discharged onto an outgoing conveyor which constitutes an infeed conveyor for the stacking apparatus herein described.

Thus FIG. 1 is a perspective view of essential portions of apparatus in accordance with this invention;

FIGS. 2 through 7 diagrammatically illustrate the stacking operation showing the articles in a succession of positions as they advance;

Figure 1:
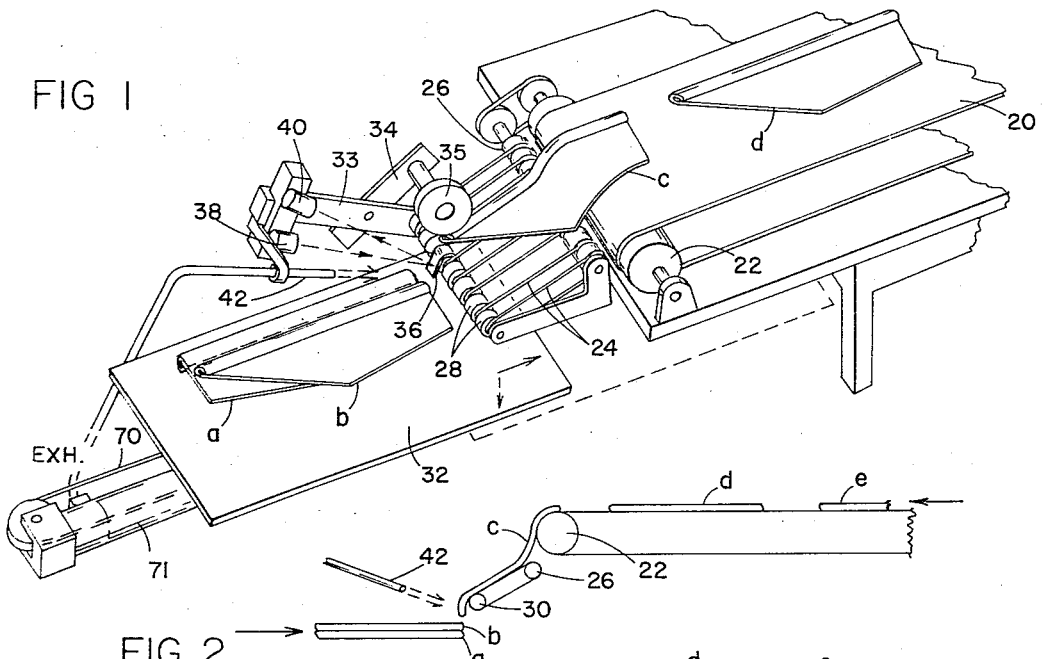

The essential portions of the apparatus shown diagrammatically in FIG. 1 include an endless conveyor belt 20, the discharge end of which passes around roller 22. Mounted ahead of the belt 20 is a composite inclined conveyor made up of a series of thin, spaced endless belts 24 passing around a driven upper roller 26 and, between spacers 28, around a lower roll 30.

Beneath roll 30 is a table 32 mounted for reciprocation in a plane parallel to the plane of the upper traverse of belt 20, from a position as shown in FIG. 1 rearwardly beneath the infeed conveyor.

Mounted above and on the far side of table 32 is a fixed support member 33 to which is pivoted an arm 34 on which a wheel 35 is journaled, the wheel 35 resting on its own weight on the underlying belt 24. The wheel thus acts as an aligning and slip-restraining guide for articles as they proceed downwardly carried frictionally by the belts 24.

Also mounted on one of the spacers 28 is a reflector plate 36 against which plays a light beam directed from a light source 38 with the reflected light being gathered by a light sensitive device 40. The light beam is thus interrupted by the opaque articles covering the reflector 36 as they proceed downwardly.

42 indicates an air nozzle directed towards the path of articles as they pass downwardly beyond the roll 30. Its distance therefrom is exaggerated in the drawing for purposes of clarity.

Typical flexible articles are illustrated in FIG. 1, articles *a* and *b* being already stacked and articles *c* and *d* and *e* being identical garment sleeve fabric portions which have been hemmed along their far edges. *d* and *e* are advancing on conveyor 20 with their far hemmed edges in alignment.

With the belts 20 and 24 operating at a continuous synchronous speed, FIGS. 2–7 illustrate the progress of articles c and d from the position shown in FIG. 1. Thus in FIG. 2 articles a and b having already been stacked on table 32, article c is moving downwardly and is in a position interrupting the light beam. An air blast issuing through nozzle 42 has bent the leading end of article c back under roll 30 and table 32 has commenced to move the stack of a and b rearwardly in the direction of the arrow.

Figure 3:
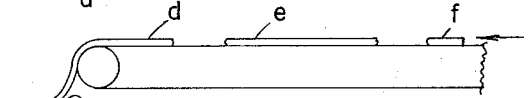
Figure 4:
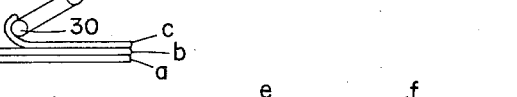

As article c progresses, it will be laid face down, as shown in FIG. 3 on top of the underlying already stacked article b and as it progresses will be laid out flat as illustrated substantially in FIG. 4. When the trailing edge of article c clears the reflector plate 36, the table stops its rearward motion and the trailing edge falls onto the forward end of the stack.

Figure 5:
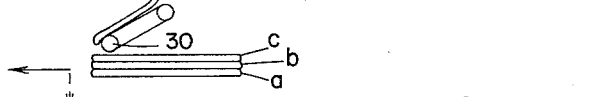
Figure 6:
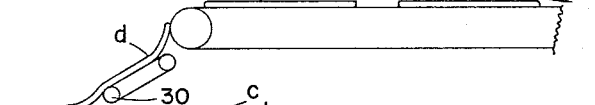
Figure 7:
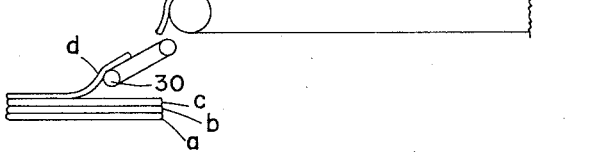
Figure 8:
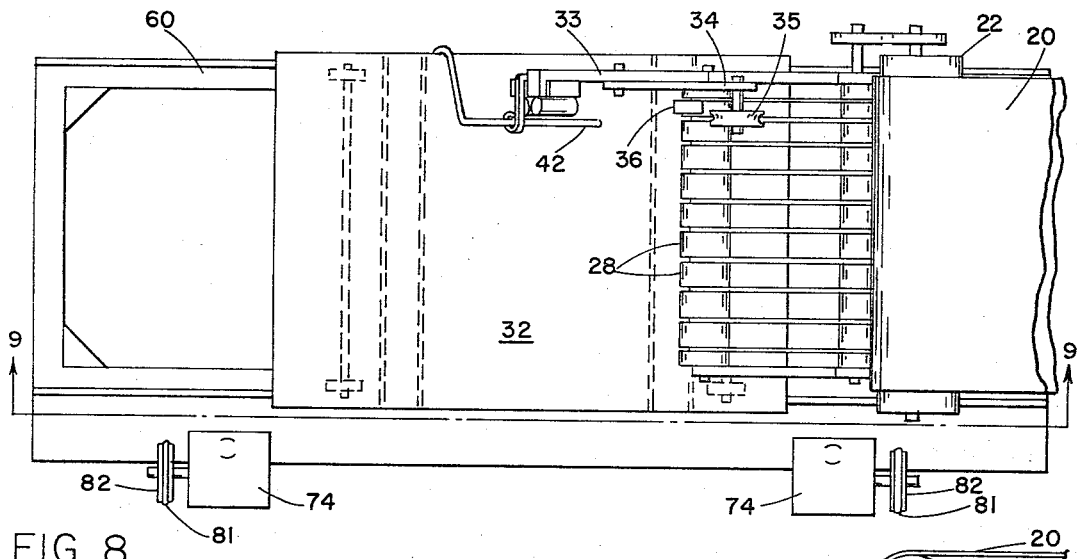
FIG. 8 is a plan view of the apparatus parts shown in FIG. 1 adding certain underlying parts.

In FIG. 5, the next article d has progressed to a point of interrupting the light beam which then actuates table 32 in the opposite direction so that the article d is progressively laid out flat face up on top of article c, as shown in FIGS. 6 and 7.

In this manner then the successive articles are stacked alternately with their faces down and with their faces up and with the ends of the alternating layers reversed, the air blast taking place only as the table starts to move back and not when it moves forwardly.

In order to keep the top of the stack of articles at a single level below roller 30 as the stack builds up, table 32, in addition to its reciprocating motion has a step-by-step downward motion with each reciprocation and preferably, for articles of differing overall thickness, has a step-by-step lateral motion first in one direction and then in the opposite direction so that the thicker portions of the articles will be offset and make a stack of less height than would be the case if their thicker portions were in vertical alignment.

It remains then to describe the mechanisms for (a) reciprocating table 32; (b) for lowering table 32 step-by-step; and (c) for moving table 32 step-by-step laterally and reversing directions.

First with respect to longitudinal reciprocation, the apparatus has a central open frame 60 having side and end rims suipported from a side angle iron 61.

Figure 9:
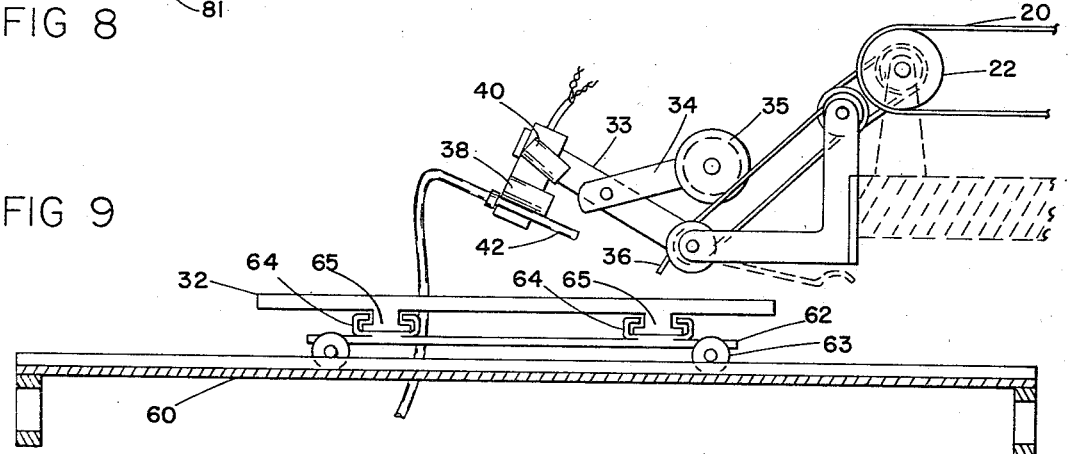
FIG. 9 is a cross-sectional view taken along the line 9—9 of FIG. 8.

A carriage 62 (FIG. 9) having four wheels 63 rests on the frame 60 and carries parallel spaced cross tracks 64 into which dovetail depending ribs 65 fixed on the bottom side of table 32.

Figure 11:
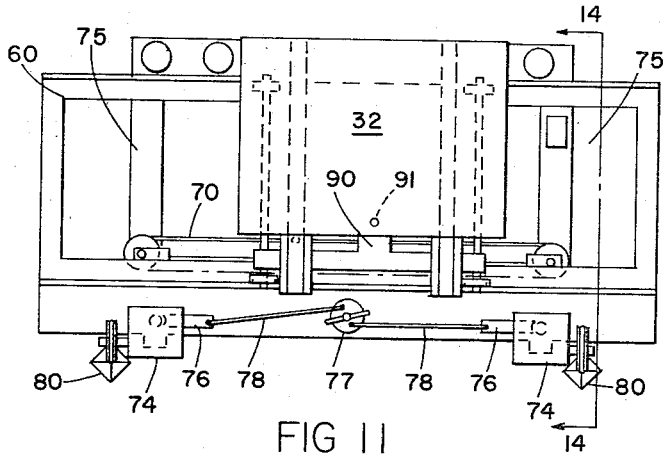
FIG. 11 is a plan view, reduced in size of the table mounting parts of the apparatus.

Carriage 62 is fastened to the cable 70 (FIG. 11) of a reversing air motor 71, the cylinder of which is mounted on frame 60.

Figure 16:
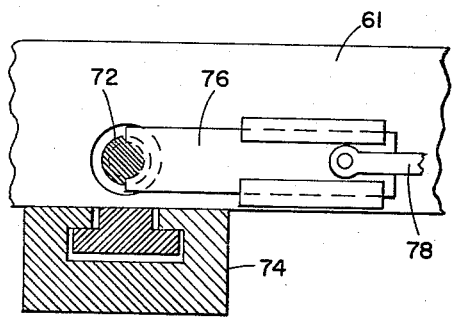
FIG. 16 is an enlarged cross-sectional detail taken along the line 16—16 of FIG. 13.

The down motion of open frame 60 is provided by journaling two upright worms 72 in the side stanchions 74 mounted on base 75. The worms loosely pierce iron 61 but are engaged by screw-threaded outer ends of two slides 76 (FIGS. 11, 16) fastened on the upper surface of iron 61. The slides are urged apart by springs (not shown) into such engagement but are releasable from such engagement by virtue of a central handled crank 77 connected by two connecting rods 78 to the adjacent inner ends of the slides 76 in order to permit the frame 60 to be quickly raised on its counterweights 80 after a stack has been completed.

Counterweights 80 hanging from cables 81 extending over a pair of pulleys 82 and fastened to the frame 60 will raise frame 60 when the slides 76 are disengaged from worms 72.

Figure 13:
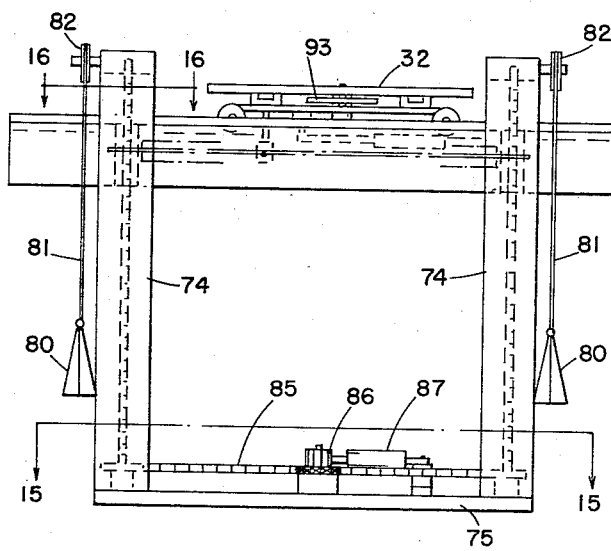
FIG. 13 is a side elevational view of the parts shown in FIG. 11.
Figure 14:
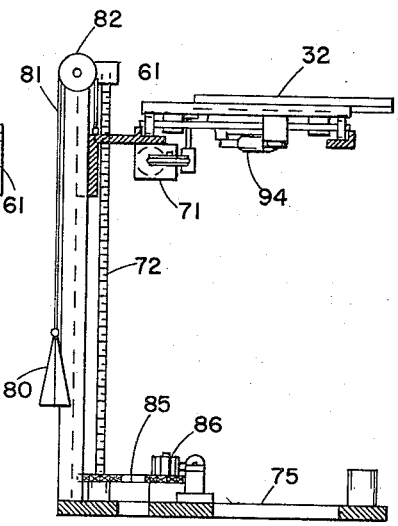
FIG. 14 is a partial end view of the apparatus shown in FIG. 13.
Figure 15:
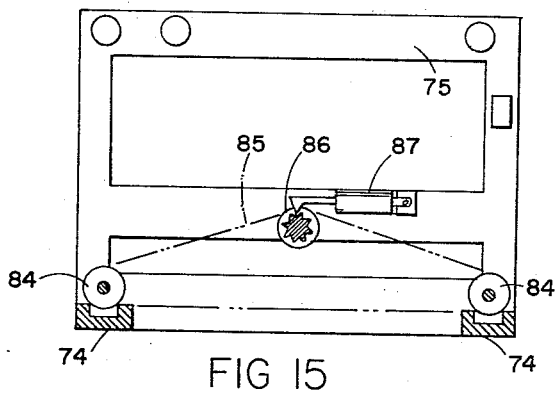
FIG. 15 is a detail in plan of a portion of the base of the apparatus.

For rotating the worms 72, each shaft carries near its bottom end a sprocket 84 which is interconnected by a sprocket chain 85 to a ratchet 86 (FIGS. 13, 14 and 15) actuated by an air motor 87.

Figure 12:
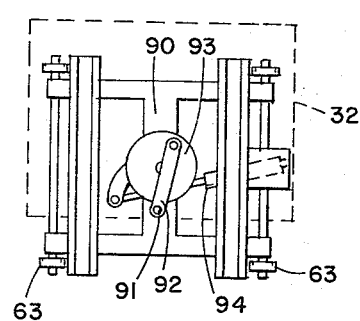
FIG. 12 is a bottom view of the support for the reciprocating table.

Similarly, as shown in FIG. 12, the bottom of table 32 carries a cross bar 90 bearing a pin 91 which is connected by a crank shaft 92 to a rotating wheel 93 which is rotated step-by-step by another air motor 94 so that actuation of the air motor and ratchet will revolve wheel 93 through 360° pulling the table 32 in one direction during one half of the revolution and in the return direction during the other half of the revolution.

Figure 10:
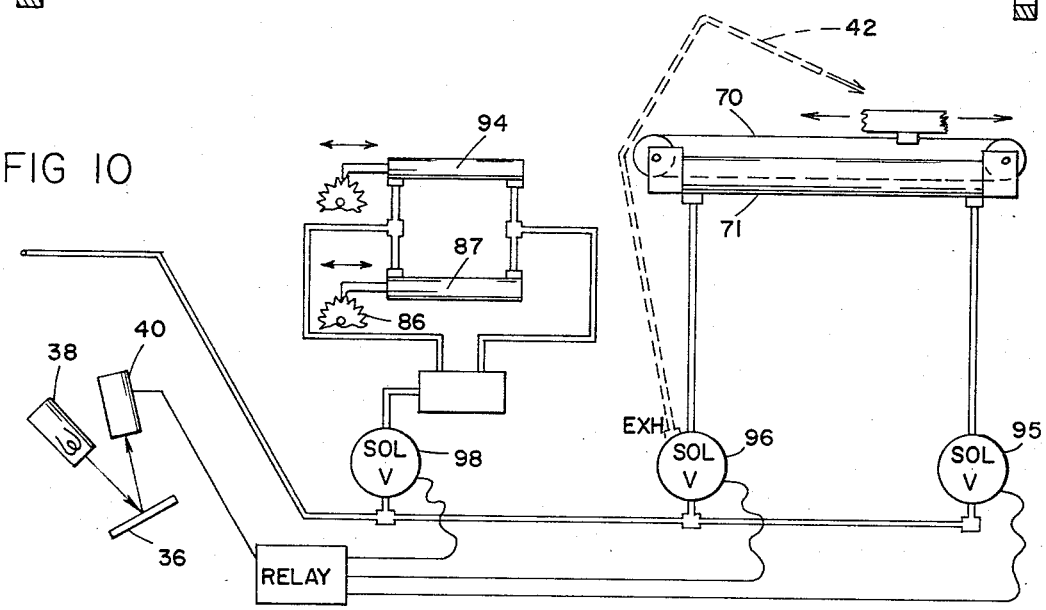
FIG. 10 is a layout of a control system for the apparatus.

The table cable 70 and two ratchets and accompanying motors 87 and 94 are shown in the layout of FIG. 10.

Figure 2:
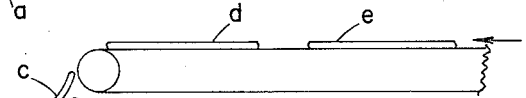

A solenoid valve 95 exhausts air from the cable motor 71 to cause the table to move in return direction and a solenoid 96 exhausts air from the motor 71 to cause the table to move forwardly in the opposite direction, the valves being normally open and pressurized. It should be understood that because the motor 71 works on the opposite traverse of cable 71 from that to which the table is attached, the piston of the motor will move in one direction while the table moves in the opposite direction. The two solenoids 95 and 96 are electrically connected to another solenoid 98 which opens a valve to the down and cross motions of the table 32 every time the table stops at each end of its path of motion. The solenoids 95 and 96 are closed alternately to exhaust air as a result of the interruption of the light beam emanating from source 38. Solenoid 96 also has an exhaust system which is connected to the air nozzle 42 so that every time the motor 71 is actuated to return the table air exhausting from the motor 71 through valve 96 will exhaust through the nozzle 42 to bend the fabric around roller 30 as shown in FIGS. 2 and 3.

Likewise upon every interruption of the light beam the motors 87 and 94 will be actuated to make one ratchet stroke.

In operation then, with identical articles moving down the belt 20, the apparatus will function to stack the articles in alternating end-to-end arrangement and alternating face-up, face-down relationship and each stroke of the table 32 will be entirely controlled by the length of each article as determined by the interruption of the light beam so that the apparatus has versatility for stacking articles of different lengths and the table will have a stroke only long enough to accommodate the particular length of articles being stacked within the maximum stroke for which the machine is designed.

The lateral motion of the table can of course be disconnected and rendered inoperative if single thickness articles are being stacked.

What is claimed is:

1. Stacking apparatus comprising:
    a conveyor for supporting and advancing a succession of transversely flexible articles face up along a pathway, and
    means adjacent the end of said supporting pathway for guiding said articles as they advance beyond said pathway into supported flat vertically stacked relation with alternate articles face up in the stack and with intervening articles face down in the stack and with the ends of the intervening articles reversed with respect to the ends of the alternate articles, said means including
    a table spaced below the end of said pathway,
    means for reciprocating said table longitudinally with respect to the end of said pathway, forwardly away from said pathway as alternate articles advance beyond said pathway to lay said alternate articles face upwardly in said stack on said reciprocating table, and for reciprocating said table rearwardly as intervening articles advance beyond said pathway, and
    means for folding the leading ends of the intervening articles as they advance beyond said pathway rearwardly to lay each of said intervening articles face downwardly in said stack as said reciprocating table advances rearwardly.

2. Stacking apparatus comprising:
    a reciprocating table,
    means for reciprocating said table, a conveyor for supporting and advancing a succession of transversely flexible articles along a pathway extending over said table, including means for feeding alternate articles in said succession angularly downwardly to lay said alternate articles into face up stacked position on said table as said table moves away from said pathway, and means for changing the direction of feed of the leading ends of intervening articles in said succession to lay said intervening articles, as said table moves back toward said pathway, angularly downwardly into face downward stacked position between the alternate articles in said stack with the ends of the intervening articles reversed with respect to the ends of said alternate articles.

3. Apparatus as claimed in claim 2, wherein said direction changing means comprises:

a nozzle, and means for blasting air through said nozzle against the leading ends of said intervening articles as they advance beyond said conveyor to bend said leading ends backwardly relative to the path of advance of the unbent alternate articles.

4. Apparatus as claimed in claim 2, having article controlled means for actuating said table reciprocating means to move said table in each direction alternately a distance determined by the length of the leading unstacked article in said succession.

5. Apparatus as claimed in claim 4, wherein said article controlled means comprises:

a light beam, said light beam being directed toward said pathway for interruption during the advance of each article past said beam, said light beam controlling an electrical circuit, said electrical circuit being adapted to actuate said table reciprocating means to move said table in one direction as alternate articles advance through said beam and in the other direction as intervening articles advance through said beam and to stop said table when said beam is uninterrupted by any article in said succession.

6. Apparatus as claimed in claim 2, having means for periodically lowering said table to maintain the top of a stack of articles supported on said table at substantially the same level as said stack increases in height.

7. Apparatus as claimed in claim 2, wherein said table is supported for lateral as well as longitudinal movement, and there are means to move said table laterally step-by-step in one direction and then back again step-by-step to offset the side edges of identical articles in said stack which have advanced on said conveyor with their side edges in alignment.

References Cited

UNITED STATES PATENTS

| | | | |
|---|---|---|---|
| 516,386 | 3/1894 | Wood | 271—76 |
| 3,113,771 | 12/1963 | Tucci. | |
| 3,198,513 | 8/1965 | Farez | 271—68 X |
| 3,281,146 | 10/1966 | Bridge | 271—68 |

EDWARD A. SROKA, *Primary Examiner.*